US 6,658,251 B1

(12) United States Patent
Lee et al.

(10) Patent No.: US 6,658,251 B1
(45) Date of Patent: Dec. 2, 2003

(54) METHOD AND APPARATUS FOR DESIGNATING WAP SERVER ADDRESS FOR WIRELESS COMMUNICATION TERMINAL

(75) Inventors: Sang-seo Lee, Seoul (KR); Yong-Suk Kim, Seoul (KR); Hyung-min Nam, Seoul (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 0 days.

(21) Appl. No.: 09/361,983

(22) Filed: Jul. 28, 1999

(30) Foreign Application Priority Data

Jul. 30, 1998  (KR) ............................................. 98-30940

(51) Int. Cl.$^7$ ................................................ H04Q 7/20
(52) U.S. Cl. ........................ 455/435; 370/328; 370/338; 370/466; 455/466; 709/238; 709/203
(58) Field of Search .................................. 370/328, 338, 370/466, 467, 401; 455/426, 435, 466, 552, 560; 709/238, 223, 225, 203, 237, 245

(56) References Cited

U.S. PATENT DOCUMENTS

| 6,058,429 A | * | 5/2000 | Ames et al. ................. 709/242 |
| 6,360,267 B1 | * | 3/2002 | Kakiuchi et al. ........... 709/227 |
| 6,587,455 B1 | * | 7/2003 | Ray et al. .................... 370/352 |

FOREIGN PATENT DOCUMENTS

| DE | 197 35 191 A1 | 2/1999 | ............ H04M/3/42 |
| EP | 0 889 660 A2 | 1/1999 | ............ H04Q/7/32 |
| JP | 0010164272 AA | 6/1998 | .......... H04M/11/00 |
| WO | 94/29995 | 12/1994 | .......... H04M/11/00 |
| WO | 95/28063 | 10/1995 | |

OTHER PUBLICATIONS

Richard Sietmann, "Mikro–Browser für Handys". In: Funkschau 23/97, pp. 100 to 103.
Communication from a Foreign Patent Office.

* cited by examiner

Primary Examiner—William Trost
Assistant Examiner—Marcos Torres
(74) Attorney, Agent, or Firm—Sughrue Mion, PLLC

(57) ABSTRACT

In a wireless communication system provided with a WAP (wireless application protocol) server which can convert different data and protocols into available data and protocols between the wireless communication system and an Internet server, a method of designating a WAP server address and a wireless communication system are disclosed. The method includes the steps of deciding via a switching system whether the registered position of the wireless communication terminal which requests the registration is changed to another registered position after confirming via the switching system whether the wireless communication terminal is eligible when a wireless communication terminal requests a registration; and answering the registration request and simultaneously transferring the address information of a corresponding WAP server via the switching system to the wireless communication terminal when the registered position of the wireless communication terminal is not changed in the above step, and answering the registration request and simultaneously transferring the address information of a corresponding WAP server via the switching system to the wireless communication terminal when the registered position of the wireless communication terminal is changed in the above step. Consequently, there is an advantage in which, according to the movement of the wireless communication terminal, a corresponding WAP server address is automatically transferred to the wireless communication terminal. The wireless communication system is provided with a WAP server which can convert different data and protocols into available data and protocols between the wireless communication system and an Internet server.

10 Claims, 3 Drawing Sheets

METHOD AND APPARATUS FOR DESIGNATING WAP SERVER ADDRESS FOR WIRELESS COMMUNICATION TERMINAL

BACKGROUND OF THE INVENTION

1. Field of the Invention

The present invention relates to a wireless communication system, and more particularly, to a method for designating an address of a WAP (wireless application protocol) server which can convert different data types into available data types between a wireless communication system and an Internet server in connection with a wireless communication terminal which can communicate with an Internet server.

2. Description of the Related Art

A WAP server connects an Internet server providing various information to a wireless communication system capable of receiving the information provided by the Internet server and converts different data types into available data types between the wireless communication system and the Internet server, and may provide wireless communication terminals with self-produced information.

As shown in FIG. 1, the wireless communication system usually used for communicating voice data includes wireless communication terminals 100, base stations 102, a base station controller 104, and a switching system 106.

Each of the base stations 102 manages wireless communication terminals 100 within a predetermined area.

As a wireless communication terminal 100 moves from one area to another, the base station controller 104 selects an appropriate base station 102 for the wireless communication terminal 100.

The switching system 106 which establishes connections between one wireless communication terminal 100 and another wire/wireless communication terminal forms a portion of a public switched telephone network (PSTN) which establishes connections between wireless communication terminals, between wire/wireless communication terminals, and between wire communication terminals.

In order to provide a wireless communication terminal with information from Internet servers by connecting the wireless communication system to the Internet server, an intermediate system for connecting them is required. The WAP server converts possibly different data and protocols into available data and protocols between the wireless communication system and the Internet server.

On the other hand, when a wireless communication terminal moves from one area to another area, the base station and the switching system which manage the wireless communication terminal must be changed to a corresponding base station and switching system. Also, the WAP server managing the wireless communication terminal must be changed to another WAP server so that the wireless communication terminal can gain access to information provided by the Internet servers. Therefore, when a registered position of the wireless communication terminal is changed to another registered position, a new WAP server address must be designated.

Conventionally, the user of the wireless communication terminal directly inputs a WAP server address. In this case, a list of WAP addresses corresponding to positions of the wireless communication terminal must be previously prepared. The user directly designates a WAP server address according to the present position of the wireless communication terminal by referring to the address list. Therefore, it is inconvenient that whenever the wireless communication terminal moves from one area managed by one WAP server to another area, a new WAP server address must be designated.

SUMMARY OF THE INVENTION

To solve the above problem, it is an objective of the present invention to provide a method and an apparatus for designating a WAP server address in which, when a wireless communication terminal requests a registration, i.e., tries to access an Internet server by switching the power on, a terminal information register transfers, via a corresponding base station, answering information to the registration request and address information of a WAP managing the wireless communication terminal. In particular, when the position registration of the wireless communication terminal is changed to another position registration, the terminal information register transfers position registration changing information and address information of a changed WAP server.

It is another objective of the present invention to provide, in a wireless communication system provided with a WAP server which can convert different data and protocols into available data and protocols between the wireless communication system and an Internet server, a method of designating a WAP server address including the steps of: requesting a registration via a wireless communication terminal; confirming whether the wireless communication terminal is eligible via a switching system; and answering the registration request and simultaneously transferring the address information of a corresponding WAP server to the wireless communication terminal via the switching system, when the wireless communication terminal requesting the registration is confirmed to be eligible in the confirming step.

In addition, it is preferable that the first registered position of the wireless communication terminal and the WAP server address information are previously stored in a predetermined terminal information register.

It is preferable that the method further includes a step of deciding, using the switching system, whether the registered position of the wireless communication terminal which requests the registration is changed to another registered position.

It is preferable that the registered area of the wireless communication terminal is not changed in the deciding step, the switching system answers the registration request and simultaneously transfers the address information of a corresponding WAP server to the wireless communication terminal, and when the registered area of the wireless communication terminal is changed in the deciding step, the switching system answers the registration request and simultaneously transfers the address information of a corresponding WAP server to the wireless communication terminal.

It is preferable in the deciding step that when the wireless communication terminal is switched on and requests a registration at a place which is not a first registered position, the switching system decides that the registration area of the wireless communication terminal is changed.

BRIEF DESCRIPTION OF THE DRAWINGS

The above objective and advantage of the present invention will become more apparent by describing in detail preferred embodiments thereof with reference to the attached drawings in which.

DESCRIPTION OF THE PREFERRED EMBODIMENTS

Figure 1:
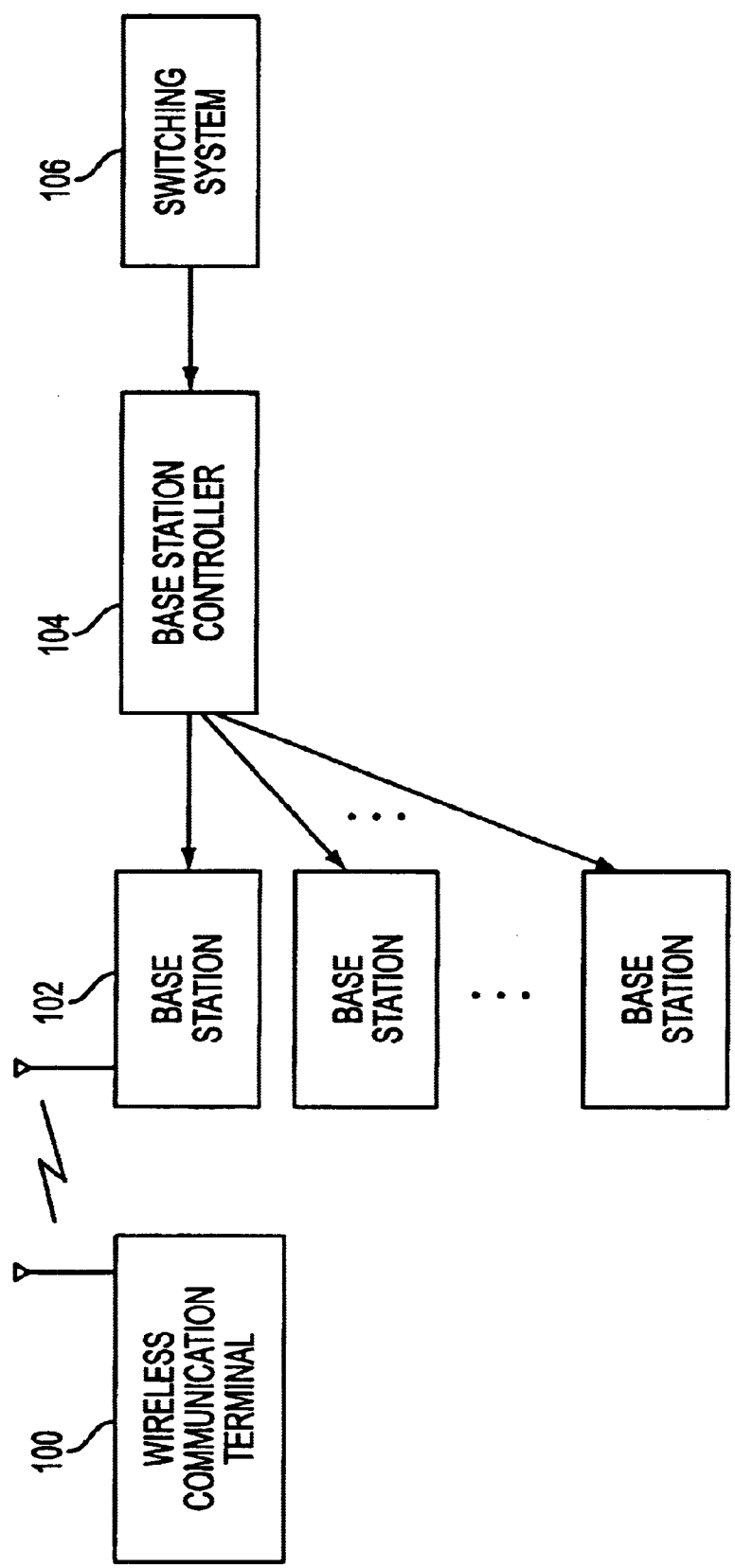
FIG. 1 is a schematic diagram illustrating a general wireless communication system.
Figure 2:
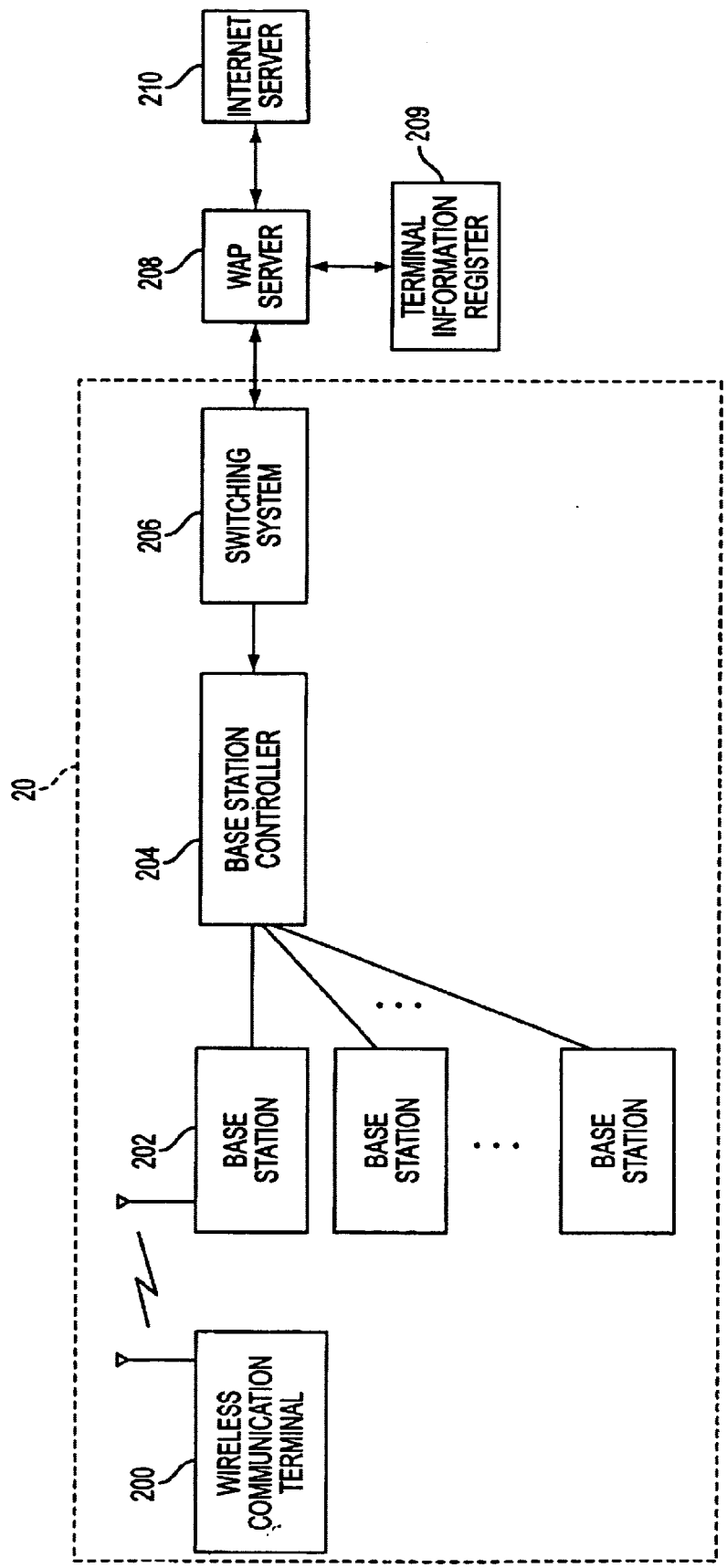
FIG. 2 is a structural block diagram illustrating a WAP server address designation system according to the present invention.

Referring to FIG. 2, a WAP server address designation system includes a wireless communication system 20, a WAP server 208, a terminal information register 209, and an Internet server 210. The wireless communication system 20 includes a wireless communication terminal 200, base stations 202, a base station controller 204, and a switching system 206.

Here, the wireless communication terminal 200 is a terminal which can receive information provided by the Internet server 210 and is capable of data communication and voice communication. That is, the wireless communication terminal 200 indicates a terminal capable of wireless data communication in which character information provided by the Internet server can be communicated in a wireless manner, in addition to the voice communication as in a general wireless telephone. Accordingly, data transmission and reception including an electronic mail are possible via this wireless communication terminal 200.

Each of the base stations 202 manages the wireless communication terminal 200 within a predetermined area.

The base station controller 204 selects an appropriate base station for the wireless communication terminal 200 as the wireless communication terminal 200 moves from one area to another.

The switching system 206 forms a portion of a public switched telephone network (PSTN) which establishes connections between the wireless communication terminal 200 and other wire/wireless communication terminals.

In addition, the switching system 206 controls the allocation of wireless communication channels and communication channel shifts, maintains necessary information by continuous data communication with the base station controller 204, monitors and analyzes traffic of communication circuits, and may redistribute communication load according to the collected traffic data.

The Internet server 210 is a self-produced information supply source in Internet communications.

The WAP server 208 is a system for connecting the wireless communication system 20 and the Internet server 210, and is intended to convert different data formats or different protocols into available data formats and protocols between the wireless communication system 20 and the Internet server 210. Also, the WAP server 208 acts as an information supply source.

The terminal information register 209 stores address information of the WAP servers managing the wireless communication terminal 200. That is, the WAP server 208, which supplies information to the wireless communication terminal 200, is changed to another WAP server depending on the position of the wireless communication terminal 200. Therefore, in the present invention, when the wireless communication terminal 200 moves to another area, the switching system 206 transfers a corresponding WAP server address stored in the terminal information register 209 to the wireless communication terminal 200 via a corresponding base station.

Figure 3:
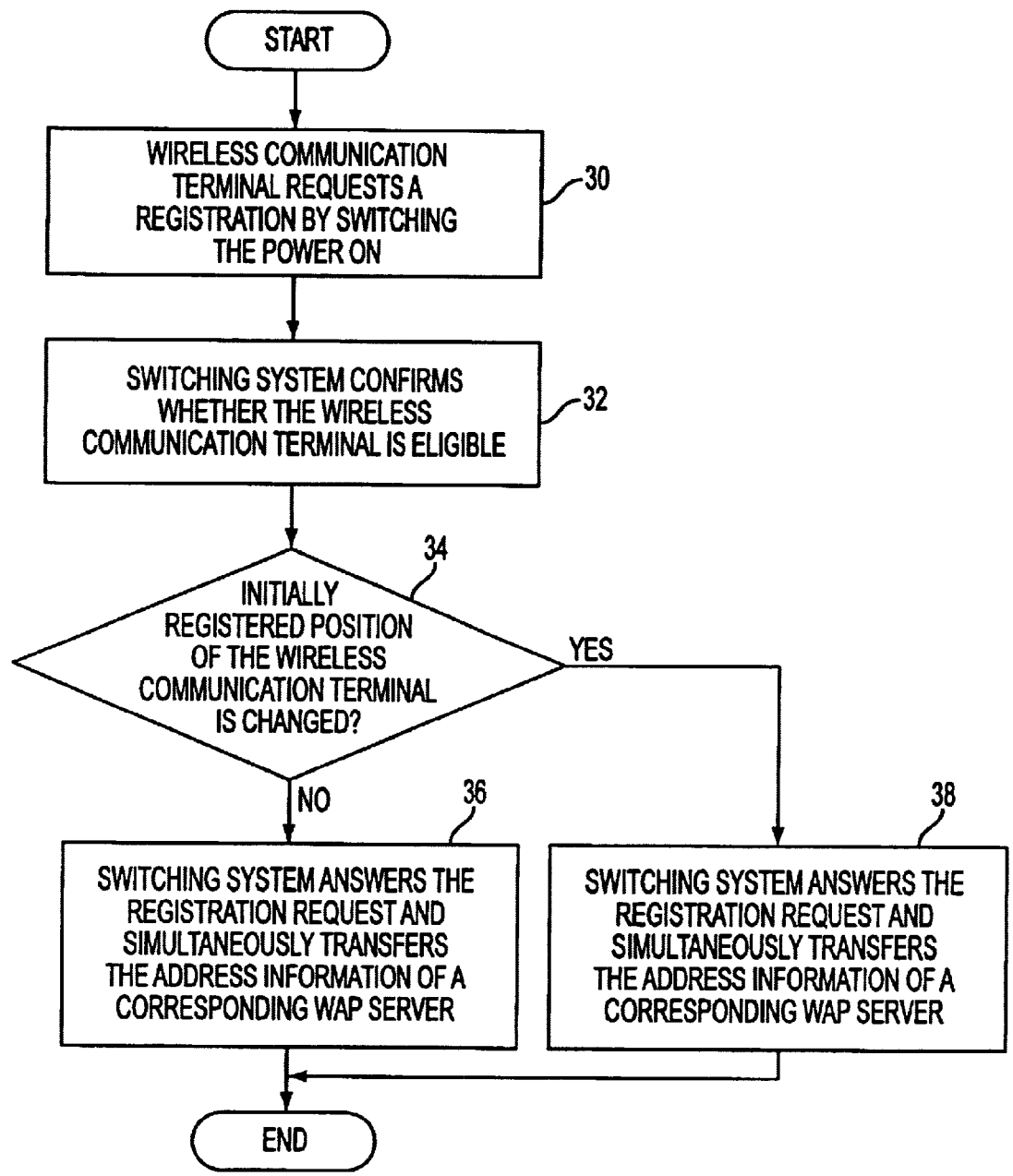
FIG. 3 is a flow chart illustrating a method for designating a WAP server address according to the present invention.

FIG. 3 shows a flow chart illustrating a method for designating a WAP server address according to the present invention.

A method for designating a WAP server address when, initially, the wireless communication terminal requests a registration by switching the power on and when the registered position of the wireless communication terminal is changed to another registered position will be described now.

The wireless communication terminal 200 requests a registration by switching the power on (step 30). That is, when the power of the wireless communication terminal 200 is switched on, the corresponding base station 202 informs the switching system 206 of this fact.

At this time, the switching system 206 confirms whether the wireless communication terminal 200 is eligible (step 32).

When the wireless communication terminal 200 requesting the registration is eligible in step 32, the switching system 206 decides whether the position of the wireless communication terminal 200 is changed to another position using previously registered position information and WAP server address information corresponding to the registered position information stored in the terminal information register 209 (step 34). That is, the wireless communication terminal 200 registers its position in the terminal information register 209 according to an initial registration area, and the registration information is stored in the terminal information register 209. In addition, when the wireless communication terminal 200 is switched on and requests a registration at a place which is not a first registered position, the switching system 206 decides that the registration area of the wireless communication terminal 200 is changed depending on the information registered in the terminal information register 209.

When the registered area of the wireless communication terminal 200 is not changed in step 34, the switching system 206 answers the registration request and simultaneously transfers the address information of a corresponding WAP server to the wireless communication terminal 200 (step 36).

When the registered area of the wireless communication terminal 200 is changed in step 34, the switching system 206 answers the registration request and simultaneously transfers the address information of a corresponding WAP server to the wireless communication terminal 200 (step 38).

Though it has been described that the switching system transfers the address information of a corresponding WAP server to the wireless communication terminal, since the address information of a corresponding WAP server is transferred to the wireless communication terminal necessarily via the corresponding base station connected to the switching system, it is possible to describe that a corresponding base station transfers the address information of a corresponding WAP server to the wireless communication terminal.

As described above, according to the present invention, whenever the registration area of a wireless communication terminal is changed, a switching system automatically transfers a corresponding WAP server address to the wireless communication terminal, if there is a registration request of the wireless communication terminal. The user of the wireless communication terminal need not input a corresponding WAP address. Consequently, there is an advantage in which, according to the movement of the wireless communication termninal, a corresponding WAP server address is automatically transferred to the wireless communication terminal.

What is claimed is:

1. In a wireless communication system provided with a WAP (wireless application protocol) server which can convert different data and protocols into available data and protocols between the wireless communication system and an Internet server, a method of designating a WAP server address including the steps of:

requesting a registration via a mobile wireless communication terminal;

confirming, via a switching system, whether the mobile wireless communication terminal is eligible; and answering the registration request and simultaneously transferring the address information of a corresponding WAP server to the mobile wireless communication terminal via the switching system, when the mobile wireless communication terminal requesting the registration is confirmed to be eligible in the confirming step.

2. The method of designating a WAP server address as claimed in claim 1, wherein a first registered position of the mobile wireless communication terminal and the WAP server address information are previously stored in a predetermined terminal information register.

3. The method of designating a WAP server address as claimed in claim 2, wherein the method further includes a step of the switching system deciding whether the first registered position of the mobile wireless communication terminal which requests the registration is changed to a second registered position.

4. The method of designating a WAP server address as claimed in claim 3, wherein when the first registered position of the mobile wireless communication terminal is not changed to the second registered position in the deciding step, the switching system answers the registration request and simultaneously transfers the address information of a corresponding WAP server to the mobile wireless communication terminal, and when the first registered position of the mobile wireless communication terminal is changed to the second registered position in the deciding step, the switching system answers the registration request and simultaneously transfers the address information of a corresponding WAP server to the mobile wireless communication terminal.

5. The method of designating a WAP server address as claimed in claim 3, wherein when the mobile wireless communication terminal is switched on and requests a registration at a place which is not the first registered position, the switching system decides that the registration position of the mobile wireless communication terminal has changed to the second registered position.

6. A wireless communication system provided with a WAP server which can convert different data and protocols into available data and protocols between an Internet server and the wireless communication system, which comprises:

a mobile wireless communication terminal which requests a registration; and a switching system which confirms whether the mobile wireless communication terminal is eligible;

wherein the switching system answers the registration request and simultaneously transfers the address information of a corresponding WAP server to the mobile wireless communication terminal, when the mobile wireless communication terminal requesting the registration is confirmed to be eligible.

7. A wireless communication system according to claim 6; in which the address information of WAP servers is stored in a terminal information register.

8. A wireless communication system provided with a WAP server which can convert different data and protocols into available data and protocols between an Internet server and the wireless communication system, which comprises:

means for requesting a registration; and means for confirming whether said means for requesting a registration is eligible;

wherein said means for confirming answers the registration request and simultaneously transfers the address information of a corresponding WAP server to the mobile wireless communication terminal, when the mobile wireless communication terminal requesting the registration is confirmed to be eligible.

9. In a wireless communication system provided with a WAP (wireless application protocol) server and a mobile wireless communication terminal, a method of designating a WAP server address including the step of:

deciding whether the registered position of the wireless-communication terminal has changed; and transferring the address information of a locally associated WAP server to the mobile wireless communication terminal, when it is decided that the position of the mobile wireless communication terminal has changed.

10. The method of claim 9, wherein the deciding step is performed when the mobile wireless communication terminal requests a registration.

* * * * *